United States Patent
Citron

(10) Patent No.: US 7,459,521 B2
(45) Date of Patent: Dec. 2, 2008

(54) HEAT-SEALABLE POLYOLEFINS AND ARTICLES MADE THEREFROM

(75) Inventor: Joel Citron, Wilmington, DE (US)

(73) Assignee: E.I. DuPont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/659,653

(22) PCT Filed: Aug. 5, 2005

(86) PCT No.: PCT/US2005/028015

§ 371 (c)(1),
(2), (4) Date: Feb. 6, 2007

(87) PCT Pub. No.: WO2006/017794

PCT Pub. Date: Feb. 16, 2006

(65) Prior Publication Data

US 2007/0213491 A1    Sep. 13, 2007

(51) Int. Cl.
C08J 5/12      (2006.01)
B32B 27/08     (2006.01)
B29C 65/02     (2006.01)

(52) U.S. Cl. .................... 528/503; 526/113; 526/352; 428/35.2; 428/35.5; 428/35.7; 428/516; 156/308.4

(58) Field of Classification Search ............... 526/113, 526/352; 528/503; 156/308.4; 428/35.2, 428/35.5, 35.7, 516
See application file for complete search history.

(56) References Cited

U.S. PATENT DOCUMENTS

| RE30,009 | E | 5/1979 | Perdue et al. |
|---|---|---|---|
| 5,071,927 | A | 12/1991 | Benham et al. |
| 5,137,994 | A | 8/1992 | Goode et al. |
| 5,358,792 | A | 10/1994 | Mehta et al. |
| 5,372,882 | A | 12/1994 | Peiffer et al. |
| 5,427,807 | A | 6/1995 | Chum et al. |
| 5,462,807 | A | 10/1995 | Halle et al. |
| 5,530,065 | A | 6/1996 | Farley et al. |
| 5,587,247 | A | 12/1996 | Kubo et al. |
| 5,686,542 | A | 11/1997 | Ostoja-Starzewski et al. |
| 5,741,861 | A | 4/1998 | Yamamoto et al. |
| 5,770,318 | A | 6/1998 | Friedman |
| 5,773,106 | A | 6/1998 | deGroot et al. |
| 5,773,129 | A | 6/1998 | Wakamatsu et al. |
| 5,792,549 | A | 8/1998 | Wilkie |
| 5,856,610 | A | 1/1999 | Tamura et al. |
| 5,880,241 | A | 3/1999 | Brookhart et al. |
| 6,214,761 | B1 * | 4/2001 | Bennett ..................... 502/117 |
| 6,586,541 | B2 | 7/2003 | Citron |
| 6,586,550 | B2 | 7/2003 | Cotts et al. |
| 6,620,895 | B1 | 9/2003 | Cotts et al. |
| 6,620,897 | B1 | 9/2003 | Smillie |

FOREIGN PATENT DOCUMENTS

| WO | WO 93/03093 | 2/1993 |
|---|---|---|
| WO | WO 95/32235 | 11/1995 |
| WO | WO 97/28960 | 8/1997 |
| WO | WO 03/039866 A1 | 5/2003 |
| WO | WO 03/039958 A2 | 5/2003 |

OTHER PUBLICATIONS

PCT International Search Report and Written Opinion, International application No. PCT/US05/28015, dated Oct. 25, 2006.
PCT International Preliminary Report of Patentability, International application No. PCT/US05/28015, dated Feb. 23, 2007.
K. R. Osborn, et al., Plastic Films, 1992, pp. 152-153 and 173-175, Technomic Publishing Co., Inc., Lancaster, PA.
H. Mark, et al., Ed., Encyclopedia of Polymer Science and Engineering, vol. 7, 1987, pp. 106-127.

* cited by examiner

*Primary Examiner*—Fred Teskin

(57) ABSTRACT

Polyolefins, preferably polyethylene, having a density of about 0.86 to about 0.93 g/mL, having three or more or branches of the formula $(CH_2CH_2)_mH$ wherein m is an integer of one or more, provided that said branched polyolefin has one both of the following properties: said branched polyolefin contains less than 2 methyl groups per 1000 methyl-ene atoms and at least 30 total branches per 1000 methylene groups; said branched polyolefin contains less than 0.3 branches of the formula —$(CH_2)_5H$ per 1000 methylene groups; and in said branched polyolefin the level hexyl+ branches is at least 80% of the level of ethyl branches, and said polyolefin contains less than 2 methyl branches per 1000 methylene groups or less than 0.3 branches of the formula —$(CH_2)_4CH_3$ per 1000 me-thylene groups or both, thereby allowing good seals to be formed rapidly. This is advantageous when heat sealing these polyolefins, for example in the form of single or multilayer films.

18 Claims, No Drawings

US 7,459,521 B2

HEAT-SEALABLE POLYOLEFINS AND ARTICLES MADE THEREFROM

FIELD OF THE INVENTION

Polyolefins, preferably polyethylene, having a density of about 0.86 to about 0.93 g/mL, polyethylene having three or more branches having the formula $-(CH_2CH_2)_mH$ where m is an integer of 1 or more form heat seals at exceptionally low temperatures and/or short sealing times, thereby allowing good seals to be formed rapidly. This is advantageous when heat-sealing so-called flexible packaging made from single or multilayer films.

TECHNICAL BACKGROUND

Polyolefins such as polyethylene and polypropylene have been used in many applications, for example in packaging such as bags and cartons. In many instances in order to form the package it is necessary to affect a seal between two different pieces or two different parts made of the same polyolefin. This may be done using adhesives, but is more commonly done by applying heat to the surfaces to be joined to soften or melt them while applying some pressure to the place where they are to be joined to form a single piece of thermoplastic. This operation is called heat-sealing, and is commonly used to join thermoplastic parts. See for instance K. R. Osborn, et al., *Plastic Films*, Technomic Publishing Co., Inc., Lancaster, Pa., U.S.A., 1992, especially p. 152-153 and 173-175; H. Mark, et al., Ed., *Encyclopedia of Polymer Science and Engineering*, Vol. 1, McGraw Hill Book Co., New York, 1985, p. 527; and ibid., Vol. 7, 1987, p. 117.

Most commonly the heating is carried out by contacting the surfaces opposite those to be joined with a hot object such as a hot bar, or heating the surfaces with hot air or infrared radiation. In any event the speed at which one can heat the surfaces to be joined to the proper temperature for joining often determines the speed at which one can heat seal the surfaces. This is particularly true for thermoplastics such as polyolefins, because they often have relatively low thermal conductivities. High-speed heat sealing is important because many such operations are high volume continuous operations where slow heat sealing speeds significantly increase costs.

One way to increase heat-sealing speeds is to lower the temperature at which the seal may be formed. This is typically done by lowering the melting point of the polymer being sealed, but has its limits since if the melting point of the polymer is lowered too much the seal itself may be too weak or the polymer characteristics may be detrimentally affected. Therefore ways of forming satisfactory seals at lower temperatures are constantly being sought.

Numerous attempts have been made to find polymers with improved heat sealing properties, see for instance U.S. Pat. Nos. 5,358,792, 5,372,882, 5,427,807, 5,462,807, 5,530,065, 5,587,247, 5,741,861, 5,770,318, 5,773,106, 5,773,129, 5,792,549, 6,620,897, WO03039958, WO9303093, WO9532235 and WO9728960. None of these references uses the polymers described herein. The specific polymers used herein are not particularly noted in these publications for use in heat-sealing applications.

SUMMARY OF THE INVENTION

This invention concerns a process for lowering the heat sealing temperature of a polyolefin-based thermoplastic, comprising the step of replacing at least a portion of the polyolefin in the thermoplastic with a branched polyolefin (BPO) having a density of about 0.86 to about 0.93 g/mL, having three or more branches of the formula $-(CH_2CH_2)_mH$ wherein m is an integer of one or more, provided that said branched polyolefin has one or both of the following properties:

said branched polyolefin contains less than 2 methyl groups per 1000 methylene atoms and at least 30 total branches per 1000 methylene groups;

said branched polyolefin contains less than 0.3 branches of the formula $-(CH_2)_5H$ per 1000 methylene groups; and in said branched polyolefin the level hexyl+branches is at least 80% of the level of ethyl branches, and said polyolefin contains less than 2 methyl branches per 1000 methylene groups or less than 0.3 branches of the formula $-(CH_2)_4CH_3$ per 1000 methylene groups or both.

This invention further concerns a first article having a first thermoplastic surface suitable for heat sealing to a second thermoplastic surface of the same or another article, wherein said first thermoplastic surface comprises a branched polyolefin having a density of about 0.86 to about 0.93 g/mL, having three or more branches of the formula $-(CH_2CH_2)_mH$ wherein m is an integer of one or more, provided that said branched polyolefin has one or both of the following properties:

said branched polyolefin contains less than 2 methyl groups per 1000 methylene atoms and at least 30 total branches per 1000 methylene groups;

said branched polyolefin contains less than 0.3 branches of the formula $-(CH_2)_4CH_3$ per 1000 methylene groups; and in said branched polyolefin the level hexyl+branches is at least 80% of the level of ethyl branches, and said polyolefin contains less than 2 methyl branches per 1000 methylene groups or less than 0.3 branches of the formula $-(CH_2)_4CH_3$ per 1000 methylene groups or both.

The invention still further concerns a process for preparing an article comprising the step of heat sealing a first thermoplastic surface to a second thermoplastic surface, wherein the first thermoplastic surface and the second thermoplastic surface comprise a branched polyolefin having a density of about 0.86 to about 0.93 g/mL, having three or more branches of the formula $-(CH_2CH_2)_mH$ wherein m is an integer of one or more, provided that said branched polyolefin has one or both of the following properties:

said branched polyolefin contains less than 2 methyl groups per 1000 methylene atoms and at least 30 total branches per 1000 methylene groups;

said branched polyolefin contains less than 0.3 branches of the formula $-(CH_2)_4CH_3$ per 1000 methylene groups; and in said branched polyolefin the level hexyl+ branches is at least 80% of the level of ethyl branches, and said polyolefin contains less than 2 methyl branches per 1000 methylene groups or less than 0.3 branches of the formula $-(CH_2)_4CH_3$ per 1000 methylene groups or both.

This invention also concerns an article made at least in part from a first thermoplastic surface and a second thermoplastic surface joined together by heat sealing, wherein the first thermoplastic surface and a second thermoplastic surface comprise a branched polyolefin having a density of about 0.86 to about 0.93 g/mL, having three or more branches of the formula $-(CH_2CH_2)_mH$ wherein m is an integer of one or more, provided that said branched polyolefin has one or both of the following properties:

said branched polyolefin contains less than 2 methyl groups per 1000 methylene atoms and at least 30 total branches per 1000 methylene groups;

said branched polyolefin contains less than 0.3 branches of the formula —$(CH_2)_4CH_3$ per 1000 methylene groups; and in said branched polyolefin the level hexyl+ branches is at least 80% of the level of ethyl branches, and said polyolefin contains less than 2 methyl branches per 1000 methylene groups or less than 0.3 branches of the formula —$(CH_2)_4CH_3$ per 1000 methylene groups or both.

A process, comprising, (a) manufacturing a branched polyolefin by contacting ethylene with a first active catalyst, which oligomerizes ethylene to a series of α-olefins, and a second active catalyst, which copolymerizes, said ethylene and said α-olefins to a branched polyolefin;

(b) forming said branched polyolefin into an article; and (c) forming a heat seal with said article wherein at least one surface, which is heat-sealed, comprises said branched polyolefin.

DETAILED DESCRIPTION OF THE PREFERRED EMBODIMENTS

The polymers used herein are hydrocarbon polyolefins, that is polymers made by the addition polymerization of olefinic bonds of one or more hydrocarbon olefins. Preferably the polymers are made from one or more monomers (olefins) of the formula $R^1HC=CHR^2$, wherein $R^1$ and $R^2$ are each independently hydrogen or alkyl; more preferably wherein one of $R^1$ or $R^2$ is hydrogen, and the other is hydrogen or n-alkyl, and especially wherein both $R^1$ and $R^2$ are hydrogen (the olefin is ethylene). A specific preferred polymer is polyethylene, that is a polymer containing about 80 mole percent or more of repeat units derived from ethylene, and another specifically preferred polymer is homopolyethylene, which contains about 98 mole percent or more of repeat units derived from ethylene.

The polymers useful herein are obtainable (and preferably obtained) by polymerizing olefins, especially ethylene, in processes as disclosed in U.S. Pat. Nos. 6,620,895, 6,586,541 and 6,586,550 (all of which are also incorporated by reference herein for all purposes as if fully set forth). Most commonly the polymers are made by polymerizing and oligomerizing ethylene using two different types of catalysts, a catalyst which can copolymerize ethylene and α-olefins of the formula $H_2C=CH(CH_2CH_2)_mH$ and a catalyst which makes these α-olefins by oligomerizing ethylene. Preferably the oligomerization catalyst produces two or more α-olefins (i.e., two or more values of m), more preferably a series α-olefins of the above formula. As noted in the above patents, it is preferred that the series of α-olefins be produced by an ethylene oligomerization catalyst that produces these olefin according to a Schulz-Flory distribution. Herein it is preferred that the Schulz-Flory constant for that distribution is about 0.50 to about 0.95, more preferably about 0.55 to about 0.90. The catalysts useful as oligomerization and polymerization catalysts, and the polymerization process conditions which may be used, are set forth in the above referenced patents.

The polymer produced by the above polymerization process may then of course be formed into an article such as a single or multilayer film, or other type of article such as a bag made from a film, which may then undergo heat sealing.

Although in this polymerization process some of the ethylene is oligomerized to α-olefins that are then copolymerized into the BPO, herein these branched when made by this process are considered to be homopolyethylenes, since they may be made from only ethylene.

The BPOs have a density of about 0.86 to about 0.93 g/mL, preferably about 0.86 to about 0.91 g/mL, and especially preferably about 0.88 to about 0.90 g/mL, at 23° C. The density, as is usually done, is measured on solid polymer without filler or other materials (except for normal small amounts of antioxidants) using the method of ASTM D1505.

Consistent with the requirements for density and as otherwise set forth above, the polyolefins utilized in accordance with the present invention contain at least some branching. Measurement (usually by $^{13}C$ NMR) and calculation of branching levels in these polymers is described in U.S. Pat. No. 5,880,241, which is hereby included by reference, and reference may be had thereto for further details. Most NMR machines don't have a high enough field frequencies to measure branch chain lengths of more than 5 carbon atoms, and that is what described in U.S. Pat. No. 5,880,241. However by using NMR machines with higher fields and using analogous methods, branches as long as 10 carbon atoms or more can be determined.

These BPOs have three or more branches of the formula —$(CH_2CH_2)_mH$ where m is an integer of 1, for example ethyl, n-butyl, n-hexyl, and longer. In the more common NMR methods used for branch determination n-hexyl is often measured together with branches longer than n-hexyl, and are often, and herein, termed hexyl+. Branches and branching levels herein are corrected for end groups, that is end groups are not included in the branching levels or branching related descriptions herein unless otherwise noted. Correction for end groups is well known in the art.

Preferably the total number of branches in the BPO is about 30 or more per 1000 methylene groups, more preferably about 30 to about 150 per 1000 methylene groups.

In another preferred embodiment, the BPO contains less than 4, more preferably less than 2, methyl branches per 1000 methylene groups. In another preferred embodiment the BPO contains less than 0.3, more preferably less than 0.2 n-amyl branches [—$(CH_2)_5H$]. When the BPO contains such few amyl groups it is preferred that it contain at least 25 branches per 1000 methylene groups. In another preferred embodiment the number of hexyl+ branches per 1000 methylene groups in the polymers is at least 80% of the number of ethyl branches per 1000 methyl groups, more preferably is about 100% or more (about equal to or greater than) the number of ethyl branches per 1000 methylene groups. In another preferred embodiment the BPO contains less than 5 branches, more preferably less than 2 branches, per 1000 methylene groups, total, of n-alkyl branches (including methyl) that contain an odd number of carbon atoms. It is to be understood that any of the above preferred structural features of BPO may be combined any one or more other preferred structural feature.

It is further preferred that the BPOs are polyethylenes, more preferably homopolyethylenes.

In accordance with one aspect of the present invention, the heat sealing temperature of a polyolefin-based thermoplastic can be lowered by replacing at least a portion of the polyolefin in the thermoplastic with the BPO as described above. The BPO can simply be used in place of the original polyolefin, or can be blended in various proportions with the original polyolefin in order to replace a portion of the same. Such a blend can be a standard physical blend, melt blend, or even a reactor blend prepared by polymerizing the (preferably) ethylene in the presence of the catalyst composition referred to above, along with a second active polymerization catalyst (a co-catalyst) such as a Ziegler-Natta and/or metallocene-type catalyst known in the art, especially such a catalyst which does not readily copolymerize ethylene and α-olefins.

The resulting thermoplastic can be used to form articles with surfaces possessing a lower heat-sealing temperature and, thus, improved processibility. Heat sealing and methods of heat sealing, along with procedures for doing heat sealing are found in U.S. Pat. No. 6,620,897, which is hereby included by reference.

In preparing articles by heat-sealing thermoplastic surfaces, it is preferred that all of the respective surfaces which are to be heat sealed comprise the BPO as described herein. More preferably, the various surfaces are made essentially only with the BPOs described above as the thermoplastic polymer, still more preferably from such BPOs which are homopolyethylenes, and especially when each of the surfaces is the same BPO or comprise the same BPO. Of course, in addition to the BPO (and optionally other thermoplastic polymer components), the surfaces can contain other additives and adjuvants commonly found in heat sealing thermoplastics such as, for example, antioxidants and stabilizers, colorants, processing aids and the like.

More than two surfaces may be sealed together, for example three films may be sealed together, and preferably all of the surfaces being sealed comprise BPO branched polymer as described herein, and more preferably all comprise the same BPO.

Heat sealing may be done by any variety of methods well known to those skilled in the art. See for instance *Plastic Films*, Technomic Publishing Co., Inc., Lancaster, Pa., U.S.A., 1992, especially p. 152-153 and 173-175. Preferably the heating of the areas to be sealed is done by thermal conduction from a hotter material (e.g., sealing bar(s) or roller(s)), by microwave heating, dielectric heating, and ultrasonic heating. The amount of pressure used may vary from that needed to contact the two (or more) surfaces to be sealed, for example finger pressure to pressure applied by presses or rollers, for example up to 700 kPa (100 psi). The heating may be before, or simultaneous with the application of pressure. Although pressure may be applied before heating, it will normally not be effective until the heating is carried out. Generally speaking, the temperatures of the polyolefin surface that is being sealed will be about 50° C. to about 110° C. This temperature will depend to some extent on the amount of pressure used, higher pressures allowing lower temperatures, since higher pressures cause more intimate contact between sealing surfaces. It also depends on the polyolefin of the heat-sealing surface, and those with lower densities will usually have lower sealing temperatures. Since much of the heat sealing done commercially is on high speed lines, the lower the temperature needed to give a seal of sufficient strength, the faster the line may often run, since it will take less time to heat the sealing surfaces to the required temperature.

The materials which may be heat sealed are any whose surface to be heat-sealed is of the BPOs described herein. Useful materials which may be heat sealed include single and multilayer films, polyolefin coated paper or paperboard, polyolefin coated metal foil (which can be considered a multilayer film), polyolefin coated articles made by injection or blow molding, polyolefin injection or blow molded articles, and rotationally molded parts, in which the surfaces to be heat sealed comprise the BPO described herein. Preferred materials for heat sealing are single and multilayer blown and/or oriented films and sheet, coated paper and paperboard, and single and multilayer films are especially preferred. A single layer film will simply be a layer of the polyolefins described herein. A multilayer film will have two or more layers, and one or both of the surface layers will be a polyolefin described herein. For example other layers may be present for the purposes of increased barrier properties to one or more materials, for added strength and/or toughness, for decorative purposes (for example to have been or be printed on), adhesive layers to improve adhesion between other layers, or any combination of these. These other layers may be polymers such as polyolefins, polyesters, polyamides, polycarbonates, acrylics, or mixtures of these, paper, and metal (foil).

The present process is particularly useful to form packages, which are also particularly useful articles. By a "package" is meant any container that is meant to be sealed most of the time (sometimes called "protective packaging"), especially before the contents are used, against ambient conditions such as air and/or moisture, and/or loss of the package's content as by evaporation. The package may be designed so that the seal against ambient conditions may be broken permanently broken as by cutting or tearing to open a sealed bag. The package may have one or more inlets and/or outlets to store a material that may be added to and/or withdrawn from the package without further opening the package. These packages are preferably made from single or multilayer films, especially multilayer films, in which the present polyolefins are at least the "sealing layer" that is the layer that forms a heat seal. These include flexible bags which are sealed, such as solid or liquid food containers, intravenous bags, pouches, and dry food containers (cereal and cracker liners in boxes).

The production of single and multilayer films, and other types of items comprising the present BPOs, including packages or various types, is well known in the art, see for instance World Patent Application 03/039866, which is hereby included by reference.

As used herein, the term "bag" is inclusive of L-seal bags, side-seal bags, end-seal bags, backseamed bags, and pouches. An L-seal bag has an open top, a bottom seal, a seal along a first side edge, and a seamless (i. e., folded, unsealed) second side edge. A side-seal bag has an open top and a seamless bottom edge, with each of its two side edges having a seal therealong. An end-seal bag is made from seamless tubing and has an open top, a bottom seal, and seamless side edges. A pouch has an open top and a bottom seal and a seal along each side edge. Although seals along the side and/or bottom edges can be at the very edge itself, (i. e., seals of a type commonly referred to as "trim seals"), preferably the seals are spaced inward (preferably about 0.6 to about 1.3 cm) from the bag side edges, and/or preferably are made using impulse-type heat sealing apparatus, which utilizes a bar which is quickly heated and then quickly cooled. A backseamed bag is a bag having an open top, a "backseam seal" running the length of the bag in which the bag film is either fin-sealed or lap-sealed, two seamless side edges, and a bottom seal along a bottom edge of the bag.

Another form of packaging in which the BPO is useful is "vacuum skin packaging". As used herein, the term "vacuum skin packaging" refers to a topographic heat seal, as contrasted to a perimeter heat seals. In forming a topographic seal, the surfaces of two films are brought into contact with one another, for example by using differential air pressure. The films contour about a product and hermetically bond to one another throughout the region (s) of film-to-film contact. Vacuum skin packaging is described in U.S. patent RE 030009, which is hereby incorporated by reference.

Other useful types and configurations of packaging, including those employing single layer and multilayer films will be found in World Patent Application 03/039866.

What is claimed is:

1. A process for lowering the heat sealing temperature of a polyolefin-based thermoplastic, comprising the step of replacing at least a portion of the polyolefin in the thermoplastic with a branched polyolefin having a density of about 0.86 to about 0.93 g/mL, having three or more branches of the formula —$(CH_2CH_2)_mH$ wherein m is an integer of one or more, provided that said branched polyolefin has one or both of the following properties:

said branched polyolefin contains less than 2 methyl groups per 1000 methylene groups and at least 30 total branches per 1000 methylene groups;

said branched polyolefin contains less than 0.3 branches of the formula —$(CH_2)_5H$ per 1000 methylene groups; and in said branched polyolefin the level hexyl+branches is at least 80% of the level of ethyl branches.

2. The process as recited in claim 1 wherein said density is about 0.88 to about 0.90.

3. The process as recited in claim 1 wherein said branched polyolefin has 30 to about 150 branches per 1000 methylene groups.

4. The process as recited in claim 1, wherein said branched polyolefin is a homopolyethylene.

5. A process for preparing an article comprising the step of heat sealing a first thermoplastic surface to a second thermoplastic surface, wherein the first thermoplastic surface and the second thermoplastic surface comprise a branched polyolefin having a density of about 0.86 to about 0.93 g/mL, having three or more branches of the formula —$(CH_2CH_2)_mH$ wherein m is an integer of one or more, provided that said branched polyolefin has one or both of the following properties:

said branched polyolefin contains less than 2 methyl groups per 1000 methylene groups and at least 30 total branches per 1000 methylene groups;

said branched polyolefin contains less than 0.3 branches of the formula —$(CH_2)_5H$ per 1000 methylene groups; and in said branched polyolefin the level of hexyl+branches is at least 80% of the level of ethyl branches, and said polyolefin contains less than 2 methyl branches per 1000 methylene groups or less than 0.3 branches of the formula —$(CH_2)_4CH_3$ per 1000 methylene groups or both.

6. The process as recited in claim 5 wherein said density is about 0.88 to about 0.90.

7. The process as recited in claim 5 wherein said branched polyolefin has 30 to about 150 branches per 1000 methylene groups.

8. The process as recited in claim 5, wherein said branched polyolefin is a homopolyethylene.

9. A process, comprising,
(a) manufacturing a branched polyolefin by contacting ethylene with a first active catalyst which oligomerizes ethylene to a series of α-olefins, and a second active catalyst which copolymerizes said ethylene and said α-olefins to a branched polyolefin;
(b) forming said branched polyolefin into an article; and
(c) forming a heat seal with said article wherein at least one surface which is heat-sealed comprises said branched polyolefin.

10. The process as recited in claim 9 wherein the density of said branched polyolefin is about 0.88 to about 0.90 g/mL.

11. The process as recited in claim 9 wherein said branched polyolefin has 30 to about 150 branches per 1000 methylene groups.

12. The process as recited in claim 9, wherein said branched polyolefin is a homopolyethylene.

13. An article made at least in part from a first thermoplastic surface and a second thermoplastic surface joined together by heat sealing, wherein the first thermoplastic surface and a second thermoplastic surface comprise a branched polyolefin having a density of about 0.86 to about 0.93 g/mL, having three or more branches of the formula —$(CH_2CH_2)_mH$ wherein m is an integer of one or more, provided that said branched polyolefin has one or both of the following properties:

said branched polyolefin contains less than 2 methyl groups per 1000 methylene groups and at least 30 total branches per 1000 methylene groups;

said branched polyolefin contains less than 0.3 branches of the formula —$(CH_2)_5H$ per 1000 methylene groups; and in said branched polyolefin the level of hexyl+branches is at least 80% of the level of ethyl branches, and said polyolefin contains less than 2 methyl branches per 1000 methylene groups or less than 0.3 branches of the formula —$(CH_2)_4CH_3$ per 1000 methylene groups or both.

14. The article as recited in claim 13 wherein said density is about 0.88 to about 0.90.

15. The article as recited in claim 13 wherein said branched polyolefin is a homopolyethylene.

16. The article as recited in claim 13 which is a package.

17. The article as recited in claim 13 wherein said first article is made from one or both of single and multilayer films.

18. The article as recited in claim 13 which is a flexible bag.

* * * * *